United States Patent
Nagayama et al.

(10) Patent No.: US 10,224,667 B2
(45) Date of Patent: Mar. 5, 2019

(54) ELECTRICAL CONNECTOR

(71) Applicant: YAZAKI CORPORATION, Tokyo (JP)

(72) Inventors: Masataka Nagayama, Shizuoka (JP); Nobuyuki Sakamoto, Shizuoka (JP); Kenji Takahashi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/873,811

(22) Filed: Jan. 17, 2018

(65) Prior Publication Data
US 2018/0261951 A1 Sep. 13, 2018

(30) Foreign Application Priority Data
Mar. 9, 2017 (JP) .................. 2017-044611

(51) Int. Cl.
*H01R 13/52* (2006.01)
*H01R 31/06* (2006.01)
*H01R 13/405* (2006.01)
*H02G 3/22* (2006.01)
*H02G 15/013* (2006.01)
*H01R 13/73* (2006.01)

(52) U.S. Cl.
CPC ....... *H01R 13/5202* (2013.01); *H01R 13/405* (2013.01); *H01R 13/521* (2013.01); *H01R 13/5216* (2013.01); *H01R 31/06* (2013.01); *H02G 3/22* (2013.01); *H02G 15/013* (2013.01); *H01R 13/73* (2013.01); *H01R 2201/26* (2013.01)

(58) Field of Classification Search
CPC .... H01R 13/5202; H01R 13/73; H01R 31/06; H01R 2201/26
USPC .......................................... 439/271
See application file for complete search history.

(56) References Cited

U.S. PATENT DOCUMENTS

| 5,772,474 | A | * | 6/1998 | Yagi | H01R 13/405 |
| | | | | | 439/660 |
| 7,255,610 | B2 | * | 8/2007 | Oohashi | B29C 37/005 |
| | | | | | 264/272.17 |
| 2011/0222254 | A1 | * | 9/2011 | Iyatani | B60T 8/368 |
| | | | | | 361/767 |
| 2015/0288082 | A1 | * | 10/2015 | Miyawaki | H01R 4/34 |
| | | | | | 439/810 |

FOREIGN PATENT DOCUMENTS

JP 8-330007 A 12/1996

* cited by examiner

*Primary Examiner* — Edwin A. Leon
(74) *Attorney, Agent, or Firm* — Kenealy Vaidya LLP

(57) ABSTRACT

An electrical connector includes a tubular housing having a partition wall extending in a direction perpendicular to a longitudinal direction of the tubular housing and a bus bar embedded in the partition wall of the housing in a state of penetrating the partition wall in the longitudinal direction. The partition wall is located at a substantially center in the longitudinal direction. A through hole is formed at a position of the bus bar at which the bus bar is embedded in the partition wall. A part of the partition wall is filled in the through hole. A range of the partition wall away from the position at which the bus bar is embedded in the partition wall has a thinned part.

9 Claims, 5 Drawing Sheets

ELECTRICAL CONNECTOR

CROSS REFERENCE TO RELATED APPLICATIONS

This application is based on Japanese Patent Application (No. 2017-044611) filed on Mar. 9, 2017, the contents of which are incorporated herein by reference.

BACKGROUND OF THE INVENTION

1. Field of the Invention

The present invention relates to an electrical connector, in particular, to an electrical connector which is installed on a wall surface of a container in which liquid or gas is enclosed, thereby enabling current to flow between an electric device inside the container and an electrical device outside the container.

2. Description of the Related Art

In the related art, for example, on the wall surface of a main body (hereinafter referred to as a "container") constituting a transmission of an automobile, an electrical connector is installed which enabling current to flow between electric devices installed inside and outside the container.

The electrical connector includes a tubular resin housing having a partition wall at a substantially center thereof, and a conductive metal body (hereinafter referred to as a "bus bar") insert-molded in the partition wall, and is configured so that a plug inserted into one side of the housing is connected to one side of the bus bar and a plug inserted in the other side of the housing is connected to the other side of the bus bar. Since oil is enclosed inside the container, liquid tightness is required between the housing and the wall surface and between the bus bar and the partition wall, respectively.

By the way, since the bus bar is made of a metal and the housing is made of resin having a thermal expansion coefficient higher than that of the metal, the housing is more greatly shrunk (hereinafter referred to as "heat shrinkage") due to a temperature change after molding. For this reason, the resin of the partition wall on one side and the resin of the partition wall on the other side partitioned by the bus bar are thermally shrunk independently, the adhesion between the bus bar and the resin is lost, and a gap is generated therebetween. Thus, an invention is disclosed that attempts to improve liquid-tightness by reducing such a gap (for example, refer to JP-A-8-330007 (pages 2 to 3, FIG. 3)).

In the invention disclosed in JP-A-8-330007, a through hole is formed in a plate-like bus bar, resin of the partition wall is filled even in the through hole at the time of insert molding, and the resin of the partition wall on one side and the resin of the partition wall on the other side partitioned by the bus bar are locally connected by the resin (hereinafter referred to as "connecting resin") filled in the through hole. Then, even when the resin is thermally shrunk, since the resin of the partition wall on one side and the resin of the partition wall on the other side are attracted by the connecting resin, no gap is formed between the bus bar and the resin.

However, since the cross-sectional area of the connecting resin is smaller than the amount of heat shrinkage of the resin of the partition wall on one side partitioned by the bus bar and the amount of heat shrinkage of the resin of the partition wall on the other side, there is a possibility that the connecting resin may extend, and the connecting resin cannot sufficiently attract the resin of the partition wall on one side and the resin of the partition wall on the other side partitioned by the bus bar. For this reason, there is a problem that a gap is formed between the bus bar (metal) and the partition wall (resin), and there is a risk that liquid tightness may not be guaranteed.

SUMMARY OF THE INVENTION

An object of the present invention is to solve such a problem, and to provide an electrical connector in which a gap between a partition wall and a bus bar is suppressed to be small, thereby improving liquid tightness, even when resin is thermally shrunk.

In order to achieve the above object, there is provided an electrical connector comprising:

a tubular housing having a partition wall extending in a direction perpendicular to a longitudinal direction of the tubular housing, the partition wall being located at a substantially center in the longitudinal direction; and a bus bar embedded in the partition wall of the housing in a state of penetrating the partition wall in the longitudinal direction, wherein a through hole is formed at a position of the bus bar at which the bus bar is embedded in the partition wall;

wherein a part of the partition wall is filled in the through hole; and wherein a range of the partition wall away from the position at which the bus bar is embedded in the partition wall has a thinned part.

For example, a rib extending in the direction perpendicular to the longitudinal direction is provided on the thinned part of the partition wall.

For example, the through hole and the rib are disposed in the same plane.

For example, a thickness of the thinned part of the partition wall in the longitudinal direction is a half of a thickness of a hole periphery portion of the partition wall in the longitudinal direction, the hole periphery portion being located at a position having a part of the partition wall at which the bus bar is embedded.

For example, the thinned part is continuously connected to the hole periphery portion through a stepped part of the partition wall.

In the electrical connector according to the present invention having the aforementioned configuration, the partition wall is thinned by the thinned part and volume of the partition wall is reduced. In addition, the resin of the partition wall on one side and the resin of the partition wall on the other side partitioned by the metal bus bar are connected by the resin filled in the through hole. Therefore, since the amount of heat shrinkage of both the resin of the partition wall on one side and the resin of the partition wall on the other side partitioned by the bus bar becomes small, the resin filled in the through hole allows the resin of the partition wall on one side and the resin of the partition wall on the other side partitioned by the bus bar to attract each other. Therefore, the gap between the bus bar (metal) and the partition wall (resin) can be suppressed to be small, and the liquid tightness is improved.

DETAILED DESCRIPTION OF THE EXEMPLARY EMBODIMENTS

Figure 1:
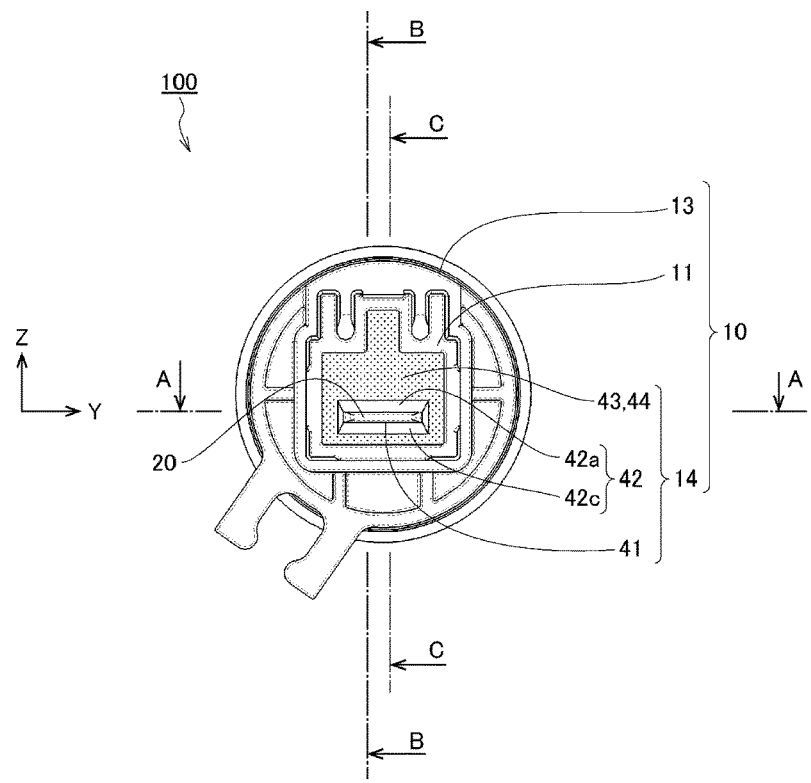
FIG. 1 is a front view illustrating an electrical connector according to a first embodiment of the invention.

Hereinafter, modes for carrying out the invention (hereinafter referred to as "first and second embodiments") will be described with reference to the drawings. It is to be noted that each drawing is schematically drawn, and the present invention is not limited to the illustrated form (shape and number of parts, etc.). In addition, in order to avoid complication of the drawing, description of some reference numerals may be omitted.

First Embodiment

Figure 2:
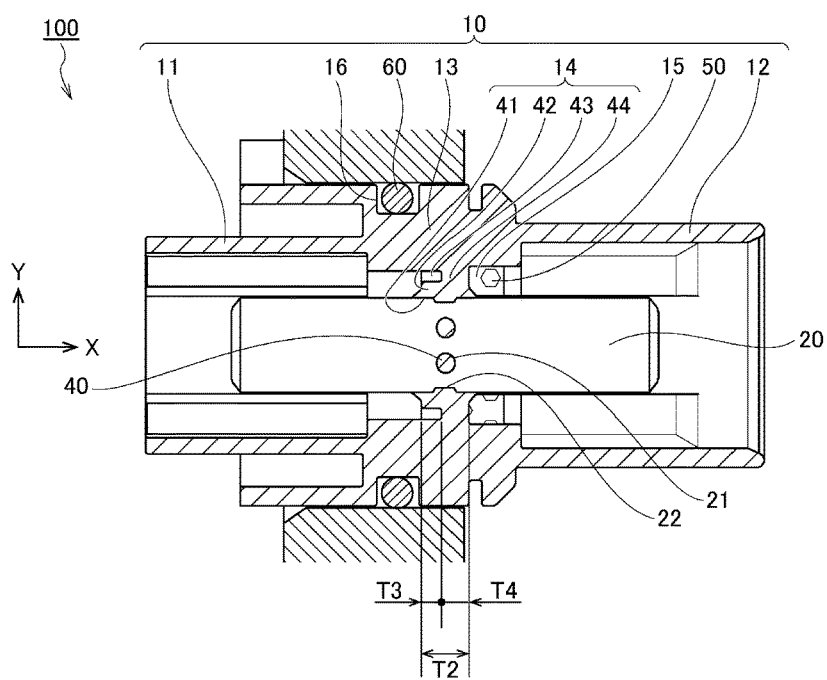
FIG. 2 is a cross-sectional view illustrating the electrical connector according to a first embodiment of the invention, and illustrating a cross section (taken along line A-A illustrated in FIG. 1) as seen in a plan view.
Figure 3:
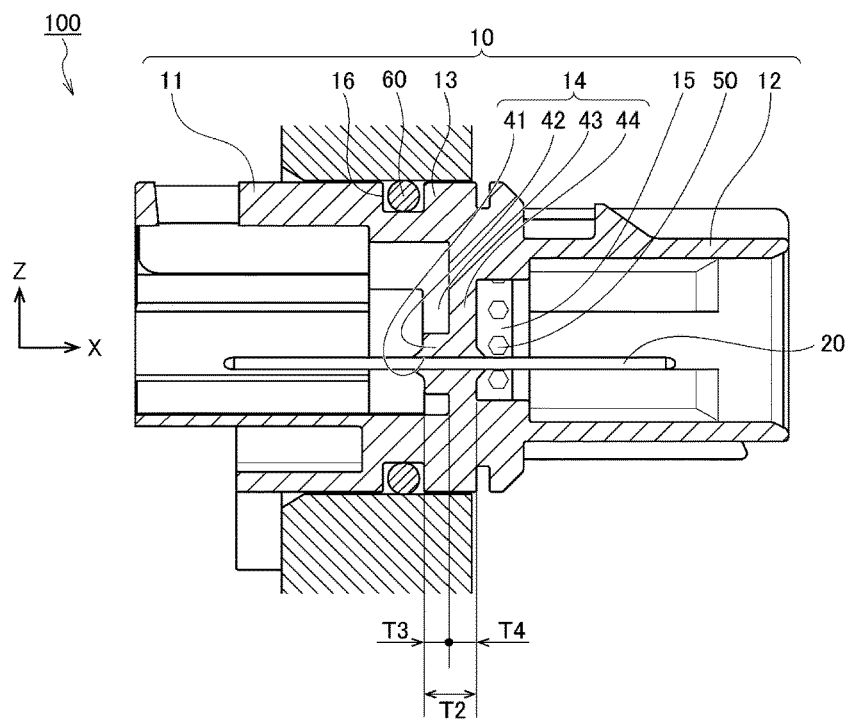
FIG. 3 is a cross-sectional view illustrating the electrical connector according to the first embodiment of the invention, and illustrating a cross section (taken along line C-C illustrated in FIG. 1) as seen in a side view.
Figure 4:
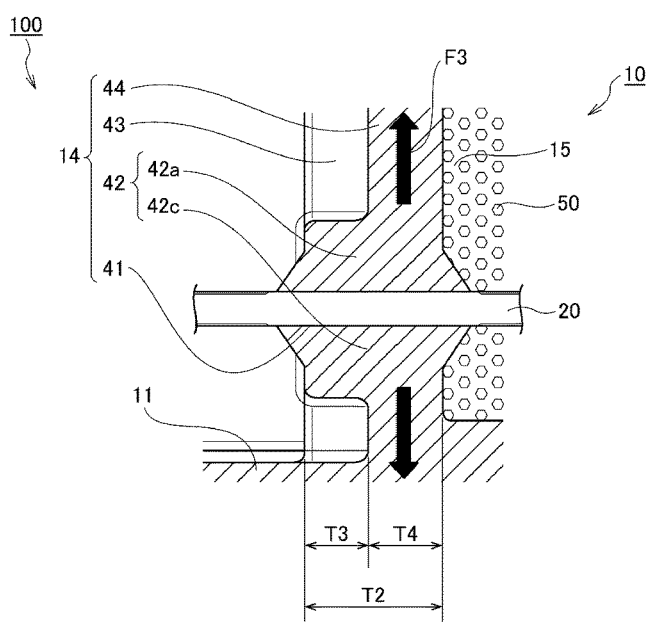
FIG. 4 is a cross-sectional view illustrating the electrical connector according to the first embodiment of the invention, and illustrating a part of FIG. 3 in an enlarged manner.
Figure 5:
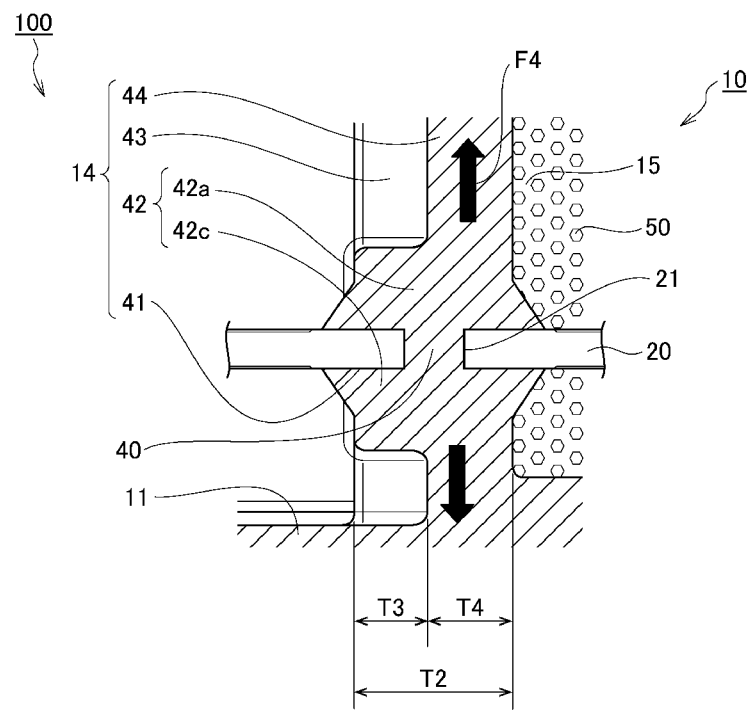
FIG. 5 is a cross-sectional view illustrating the electrical connector according to the first embodiment of the invention, and illustrating a cross section (taken along line B-B illustrated in FIG. 1) in an enlarged manner as seen in a side view.
Figure 6:
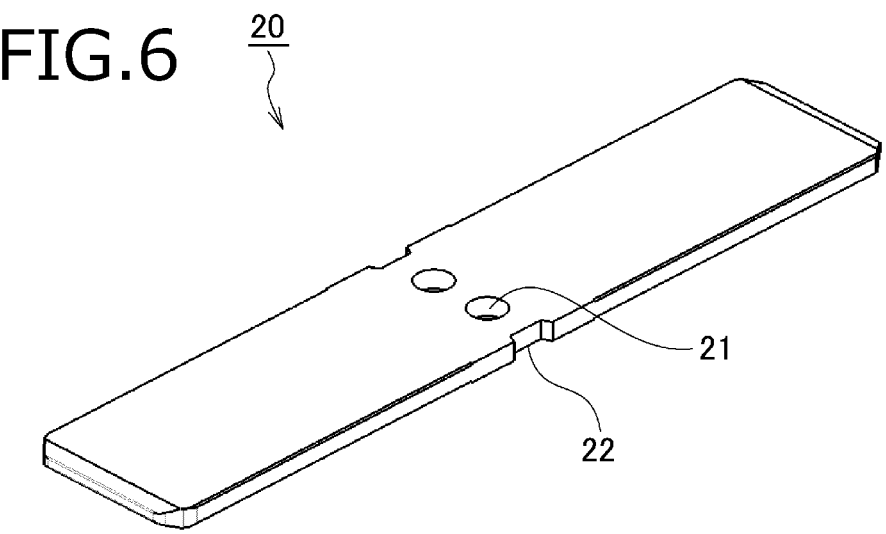
FIG. 6 is a perspective view illustrating the electrical connector according to the first embodiment of the invention, and illustrating a part (bus bar) of the component members.

FIGS. 1 to 6 illustrate an electrical connector according to a first embodiment of the present invention, wherein FIG. 1 is a front view, FIG. 2 is a cross-sectional view illustrating a cross section (taken along line A-A illustrated in FIG. 1) as seen in a plan view, FIG. 3 is a cross-sectional view illustrating a cross-section (taken along line C-C illustrated in FIG. 1) as seen in a side view, FIG. 4 is a cross-sectional view illustrating a part of FIG. 3 in an enlarged manner, FIG. 5 is a cross-sectional view illustrating a cross section (taken along line B-B illustrated in FIG. 1) as seen in a side view in an enlarged manner, and FIG. 6 is a perspective view illustrating a part (bus bar) of the component members.

(Electrical Connector)

In FIGS. 1 to 6, an electric connector 100 includes a housing 10 made of resin, and a metal bus bar 20 embedded in the housing 10 (the metal bus bar 20 is insert-molded in the housing 10). For the sake of convenience of explanation, a longitudinal direction of the plate-like bus bar 20 is defined as an X direction, a plane (a plane viewed in a plan view) parallel to the wide surface of the bus bar 20 is defined as an X-Y plane (a plane including the X direction and the Y direction), and a plane (a plane viewed in a side view) perpendicular to the wide plane of the bus bar 20 is defined as an X-Z plane (a plane including the X direction and the Z direction).

(Housing)

The housing 10 has a tubular shape, and includes a first tubular portion 11 and a second tubular portion 12 that are parallel to the longitudinal direction (X direction), a central tubular portion 13 that connects the first tubular portion 11 and the second tubular portion 12, and a partition wall 14 (a plane including the Z direction) formed in the central tubular portion 13 and perpendicular to the longitudinal direction (see FIGS. 2 and 3).

Further, a sealing member enclosing portion 15 is provided between the partition wall 14 and the second tubular portion 12 on the inner periphery of the central tubular portion 13, and a sealing member 50 is installed in the sealing member enclosing portion 15. Further, an annular O-ring groove 16 is provided on the outer periphery of the central tubular portion 13, and an O-ring 60 is installed in the O-ring groove 16.

(Hole Periphery Portion)

An insert hole 41 through which the bus bar 20 passes is formed in the partition wall 14, and the periphery of the insert hole 41 is a hole periphery portion 42 having a thickness (a distance in the X direction) T2. Since the bus bar 20 is a plate-like strip with a rectangular cross section, the hole periphery portion 42 has a rectangular shape when viewed in a front view (a cross section parallel to the Y-Z plane). Further, since the predetermined range close to the insert hole 41 is inclined so as to be thicker as it approaches the insert hole 41 in the hole periphery portion 42, a contact area (a facing area) between the bus bar 20 and the resin is widened.

Further, for convenience of explanation, one side (an upper side in FIG. 1) and the other side (a lower side in FIG. 1) of the hole periphery portion 42 partitioned by the bus bar 20 are referred to as a hole peripheral upper portion 42a and a hole peripheral lower portion 42c, respectively (See FIGS. 4 and 5).

(Thinned Part)

Further, on the side of the first cylinder of the partition wall 14, the portion between the outer periphery of the hole periphery portion 42 and the inner periphery of the central tubular portion 13 is thinned by a depth (the distance in the X direction) T3 so as to surround the hole periphery portion 42 (herein after referred to as a "thinning removal portion 43"). Therefore, the partition wall 14 has the hole periphery portion 42, and a thinned portion left after the thinning (hereinafter referred to as a "thinning residue portion 44"), and a thickness T4 of the thinning residue portion 44 is a value obtained by subtracting the depth T3 of the thinning removal portion 43 from the thickness T2 of the hole periphery portion 42 (T4=T2−T3). That is, the volume of the partition wall 14 is reduced by the volume of the thinning removal portion 43.

(Bus Bar)

The bus bar 20 is a strip having a rectangular cross section and made of a metal having conductivity, and the substantially center of the bus bar 20 in the longitudinal direction penetrates the partition wall 14 (the same as the insert hole 41). At the substantially center of the bus bar 20 in the longitudinal direction, a through hole 21 is formed at a position away from the side edge, and a notch 22 is formed at the position of the side edge (see FIG. 6). At this time, the resin in the insert-molding is filled in the through hole 21 and the notch 22 (hereinafter, the filled resin is referred to as "connecting resin 40", see FIG. 5).

Although the through holes 21 are formed in two places and are disposed on a virtual line which connects the notches 22, the present invention is not limited thereto. As long as the resin is filled, the number or the arrangement form is not limited. Further, the through hole 21 is sized such that the resin can infiltrate thereinto at the time of insert-molding and the through hole does not hinder the electric performance of the bus bar 20.

In the above description, the number of bus bar 20 is one, but the present invention is not limited thereto, and a plurality of bus bars 20 may be used. At this time, a plurality of bus bars 20 may be installed in the common hole periphery portion 42, or a plurality of hole periphery portions 42 may be provided, the bus bars 20 may be installed in each hole periphery portion, and the space between the hole periphery portions 42 may be thinned.

Since the volume of the partition wall 14 of the electrical connector 100 is reduced by the portion corresponding to the volume of the thinning removal portion 43, the amount of heat shrinkage of the thinning residue portion 44 is smaller than the amount of heat shrinkage of the partition wall 14 when there is no thinning (when there is no thinned part). For this reason, the force (F3) which pulls the hole periphery portion 42 toward the outside, that is, the force trying to enlarge the insert hole 41 is reduced (see FIG. 4).

Furthermore, in addition to this, the resin filled in the through hole 21 (hereinafter referred to as "connecting resin 40") connects the hole peripheral upper portion 42a and the hole peripheral lower portion 42c to each other to attract the hole peripheral upper portion 42a and the hole peripheral lower portion 42c. Thus, especially in the range close to the connecting resin 40, the force (F4) for pulling the hole peripheral portion 42 toward the outside is further reduced (see FIG. 5).

Therefore, a gap is hard to be generated between the bus bar 20 and the insert hole 41 and is suppressed to be small, and the expansion of the generated gap is also suppressed.

Since the volume of the portion of the thinning residue portion 44 connected to the hole peripheral upper portion 42a through a step part and the volume of the portion of the thinning residue portion connected to the hole peripheral lower portion 42c through the step part are different from each other, the respective amounts of heat shrinkage also differ from each other.

Second Embodiment

Figure 7:
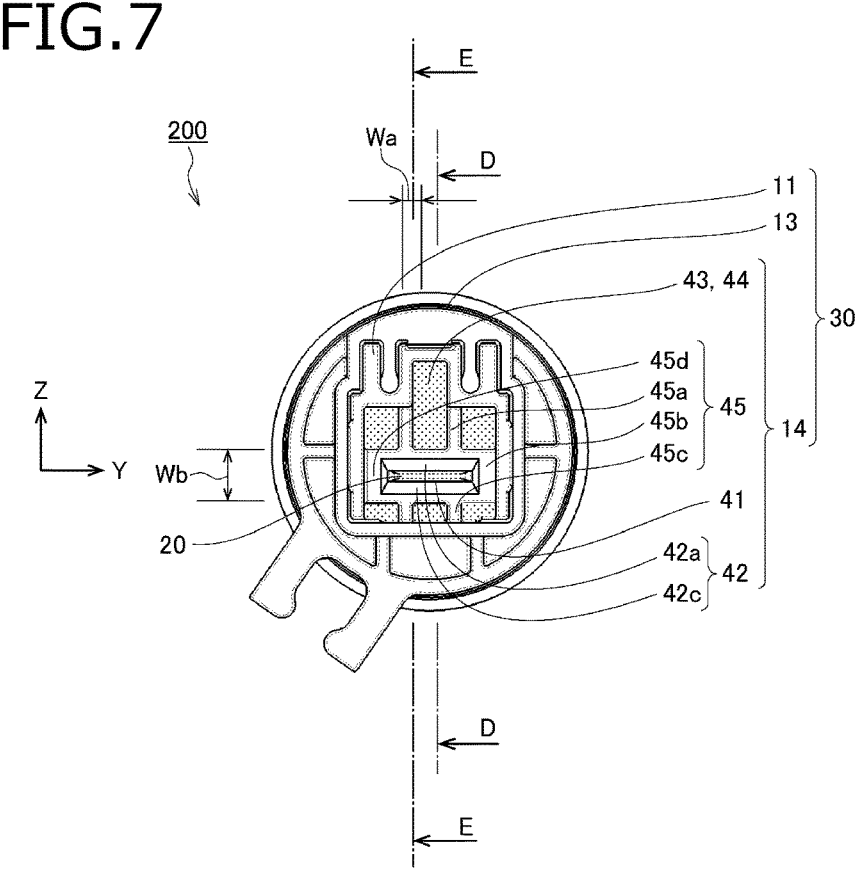
FIG. 7 is a front view illustrating an electrical connector according to a second embodiment of the invention.
Figure 8:
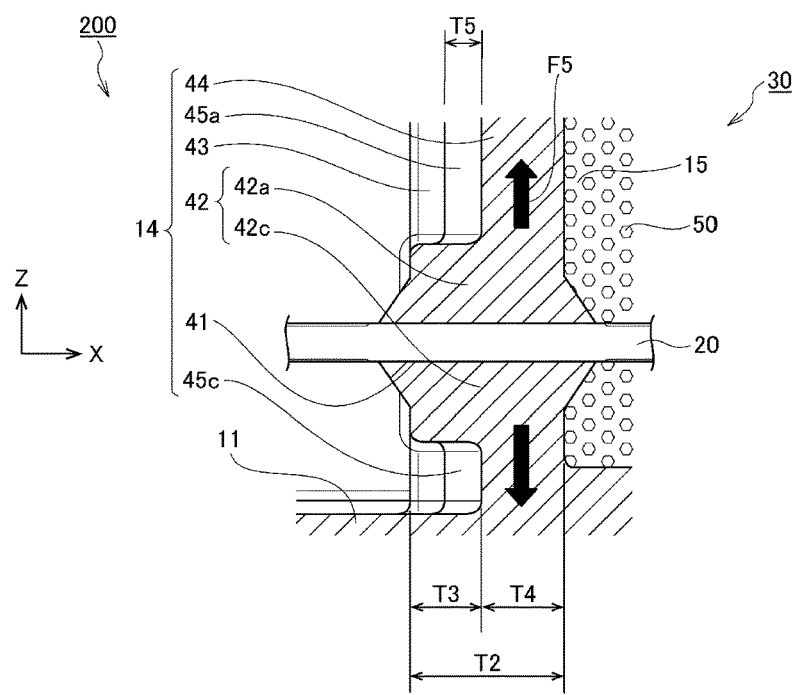
FIG. 8 is a cross-sectional view illustrating the electrical connector according to the second embodiment of the invention, and illustrating a cross section (taken along line D-D illustrated in FIG. 7) as seen in a side view in an enlarged manner.
Figure 9:
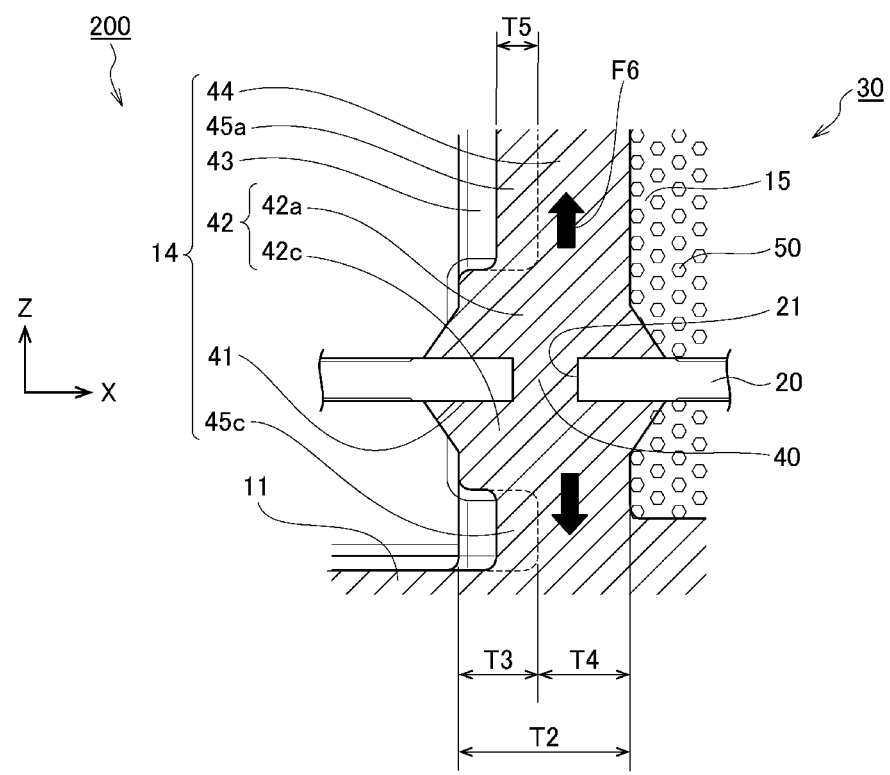
FIG. 9 is a cross-sectional view illustrating the electrical connector according to the second embodiment of the invention, and illustrating a cross section (taken along line E-E illustrated in FIG. 7) as seen in a side view in an enlarged manner.

FIGS. 7 to 9 illustrate an electrical connector according to a second embodiment of the present invention, wherein FIG. 7 is a front view, FIG. 8 is a cross-sectional view illustrating a cross section (taken along line D-D illustrated in FIG. 7) as seen in a side view in an enlarged manner, and FIG. 9 is a cross-sectional view illustrating a cross section (taken along line E-E illustrated in FIG. 7) as seen in a side view in an enlarged manner. The same or corresponding parts as those in the first embodiment are denoted by the same reference numerals, and a partial explanation will be omitted.

(Rib)

In FIGS. 7 to 9, an electrical connector 200 includes a bus bar 20 and a housing 30. The housing 30 corresponds to a housing in which a rib 45 integrated with the thinning residue portion 44 is provided in the thinning removal portion 43 of the housing 10 in the electrical connector 100.

The rib 45 connects the outer periphery of the hole periphery portion 42 and the inner periphery of the central tubular portion 13 in a direction perpendicular to the longitudinal direction. That is, the rib 45 is formed to include an upper rib 45a (connected to the hole peripheral upper portion 42a), a right rib 45b, a lower rib 45c (connected to the hole peripheral lower portion 42c), and a left rib 45d provided respectively in four directions of the hole periphery portion 42, and each rib has a thickness T5 (T3>T5) smaller than the depth T3 of the thinning removal portion 43.

At this time, the upper rib 45a and the lower rib 45c are parallel to the X-Z plane and are located on the same plane. Further, the right rib 45b and the left rib 45d are parallel to the X-Y plane and are located on the same plane. Although the number of the upper rib 45a and the lower rib 45c is two and the number of the right rib 45b and the left rib 45d is one, the number thereof is not limited, and the width Wa of the upper rib 45a and the lower rib 45c, or the width Wb of the right rib 45b and the left rib 45d is not limited (see FIG. 7).

Similar to the electrical connector 100, the thinning removal portion 43 is formed in the electrical connector 200 so that a force to pull out the hole periphery portion 42 toward the outside is reduced. In addition, the electrical connector 200 includes the rib 45, thinning removal portion and the volume of the rib 45 is smaller than the volume of the thinning residue portion 44. Accordingly, the amount of heat shrinkage of the rib 45 is smaller than the amount of heat shrinkage of the thinning residue portion 44. That is, the volume of the upper rib 45a is smaller than the volume of the portion of the thinning residue portion 44 (equal to the volume of the portion on the upper rib 45a side partitioned by the hole periphery portion 42) in which the upper rib 45a is integrated. Further, the volume of the lower rib 45c is smaller than the volume of the portion of the remaining thinning removal portion 44 (equal to the volume of the portion on the lower rib 45c side partitioned by the hole periphery portion 42) in which the lower rib 45c is integrated.

Then, since the amount of heat shrinkage of the rib 45 is smaller than the amount of heat shrinkage of the thinning residue portion 44, the rib 45 serves as a 'brace member' which stretches between the inner periphery of the central tubular portion 13 and the hole periphery portion 42 with respect to the thinning residue portion 44, thereby further reducing the amount of heat shrinkage of the thinning residue portion 44. Therefore, the force (F5) for pulling the hole periphery portion 42 toward the outside, that is, the force (F5) trying to enlarging the insert hole 41 by separating the hole peripheral upper portion 42a and the hole peripheral lower portion 42c away from each other, is further reduced by providing the rib 45 (F5<F3, see FIGS. 4 and 8).

Therefore, a gap between the bus bar 20 and the insert hole 41 is further hard to be generated, and is suppressed to be small, and the expansion of the generated gap is further suppressed.

Further, as illustrated in FIG. 9, the upper rib 45a, the lower rib 45c, and the through hole 21 are aligned on the same straight line (on the straight line in the Z direction) such that their respective phases (positions in the X-Y direction) coincide with each other. Therefore, the heat shrinkage force of the upper rib 45a and the heat shrinkage force of the lower rib 45c are linearly transmitted in the Z direction via the connecting resin 40, and the upper rib 45a, the connecting resin 40, and the lower rib 45c behave as if they are an integrated object.

At this time, the amount of heat shrinkage of the upper rib 45a and the amount of heat shrinkage of the lower rib 45c are smaller than the amount of heat shrinkage of the thinning residue portion 44, and the upper rib 45a and the lower rib 45c are effectively attracted to each other by the connecting resin 40. Accordingly, such an integrated object strongly attracts the hole peripheral upper portion 42a and the hole peripheral lower portion 42c. Then, the force (F6) trying to pull apart the hole peripheral upper portion 42a from the hole peripheral lower portion 42c greatly decreases (see FIG. 9).

Therefore, a gap between the bus bar 20 and the insert hole 41 is further hard to be generated, and is suppressed to be small, and the expansion of the generated gap is further suppressed.

MODIFICATION EXAMPLE

In the above description, the phases (positions in the X-Y direction) of the upper rib 45a, the lower rib 45c, and the through hole 21 coincide with each other. However, the present invention is not limited thereto, and the respective phases may be different from each other. At this time, although the heat shrinkage force of the upper rib 45a and the heat shrinkage force of the lower rib 45c are not transmitted in a substantially linear manner via the connecting resin 40, but are transmitted in an oblique direction via the connecting resin 40. Therefore, it is possible to obtain the operational effect (the operational effect of decreasing the force to pull apart the hole peripheral upper portion 42a and the hole peripheral lower portion 42c) according to the above configuration.

In the above description, the number of bus bar 20 is one, but the present invention is not limited thereto, and a plurality of bus bars 20 may be used. In this case, a plurality of bus bars 20 may be provided in the common hole periphery portion 42, or a plurality of hole periphery portions 42 are provided, the bus bars 20 are installed therein respectively, the space between the hole periphery portions 42 is thinned to form the thinning removal portion 43 and the thinning residue portion 44, and the rib 45 may be provided in the thinning removal portion 43.

The present invention has been described on the basis of the first and second embodiments. It is to be understood by those skilled in the art that the first and second embodiments are examples, various modified examples can be made to each of these components and combinations thereof, and that such modified examples are also within the scope of the present invention.

Since the present invention has been described above, it can be widely used as various electrical connectors.

What is claimed is:

1. An electrical connector comprising:
a tubular housing having a partition wall extending in a direction perpendicular to a longitudinal direction of the tubular housing, the partition wall being located at a substantially center in the longitudinal direction; and
a bus bar embedded in the partition wall of the housing in a state of penetrating the partition wall in the longitudinal direction,
wherein a through hole is formed at a position of the bus bar at which the bus bar is embedded in the partition wall;
wherein a part of the partition wall is filled in the through hole; and
wherein a range of the partition wall away from the position at which the bus bar is embedded in the partition wall has a thinned part.

2. The electrical connector according to claim 1, wherein a rib extending in the direction perpendicular to the longitudinal direction is provided on the thinned part of the partition wall.

3. The electrical connector according to claim 2, wherein the through hole and the rib are disposed in the same plane.

4. The electrical connector according to claim 1, wherein a thickness of the thinned part of the partition wall in the longitudinal direction is a half of a thickness of a hole periphery portion of the partition wall in the longitudinal direction, the hole periphery portion being located at a position having a part of the partition wall at which the bus bar is embedded.

5. The electrical connector according to claim 4, wherein the thinned part is continuously connected to the hole periphery portion through a stepped part of the partition wall.

6. The electrical connector according to claim 1, wherein a central tubular portion that connects a first tubular portion and a second tubular portion of the tubular housing has an inner periphery,
wherein an insert hole through which the bus bar passes is formed in the partition wall, and a periphery of the insert hole is a hole periphery portion having a first thickness, and
wherein a portion between the outer periphery of the hole periphery portion and the inner periphery of the central tubular portion is thinned by a depth of a second thickness so as to surround the hole periphery portion to thereby form a thinning removal portion of the thinned part.

7. The electrical connector according to claim 6, wherein the partition wall has the hole periphery portion, and a thinning residue portion left after the thinning, and a third thickness of the thinning residue portion is a value obtained by subtracting a depth the second thickness of the thinning removal portion from the first thickness of the hole periphery portion.

8. The electrical connector according to claim 6, wherein a volume of the partition wall is reduced by the volume of the thinning removal portion.

9. An electrical connector comprising:
a tubular housing having a partition wall extending in a direction perpendicular to a longitudinal direction of the tubular housing, the partition wall being located at a substantially center in the longitudinal direction; and
a bus bar embedded in the partition wall of the housing in a state of penetrating the partition wall in the longitudinal direction,
wherein a through hole is formed at a position of the bus bar at which the bus bar is embedded in the partition wall,
wherein a part of the partition wall is filled in the through hole,
wherein a range of the partition wall away from the position at which the bus bar is embedded in the partition wall has a thinned part, and
wherein a rib extending in the direction perpendicular to the longitudinal direction is provided on the thinned part of the partition wall.

* * * * *